United States Patent
Enyedy et al.

(10) Patent No.: US 7,624,908 B2
(45) Date of Patent: Dec. 1, 2009

(54) WELDING WIRE FEEDER AND CONNECTION APPARATUS

(75) Inventors: Edward A. Enyedy, Eastlake, OH (US); Kenneth L. Justice, Wickliffe, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 650 days.

(21) Appl. No.: 11/205,864

(22) Filed: Aug. 17, 2005

(65) Prior Publication Data
US 2007/0039934 A1    Feb. 22, 2007

(51) Int. Cl.
B23K 9/10    (2006.01)
(52) U.S. Cl. .................................................. 228/137.71
(58) Field of Classification Search ............. 219/137.2, 219/137.71
See application file for complete search history.

(56) References Cited

U.S. PATENT DOCUMENTS

| | | | |
|---|---|---|---|
| 3,629,547 A * | 12/1971 | Kester et al. ................. | 219/120 |
| 4,508,954 A | 4/1985 | Kroll | |
| 4,665,300 A | 5/1987 | Bellefleur | |
| 5,025,127 A * | 6/1991 | Gilliland ................... | 219/130.1 |
| 5,410,126 A * | 4/1995 | Miller et al. .............. | 219/130.1 |
| 5,816,466 A | 10/1998 | Seufer | |
| 5,836,539 A | 11/1998 | Grimm et al. | |
| 6,213,357 B1 | 4/2001 | Rybicki | |
| 6,225,596 B1 | 5/2001 | Chandler et al. | |
| 6,479,795 B1 * | 11/2002 | Albrecht et al. .......... | 219/137.2 |
| 6,504,133 B2 | 1/2003 | Nowak et al. | |
| 6,536,644 B2 | 3/2003 | Plow | |
| 6,705,563 B2 | 3/2004 | Luo et al. | |
| 6,707,004 B2 * | 3/2004 | Matiash et al. ........... | 219/137.2 |
| 6,720,529 B2 | 4/2004 | Davidson et al. | |
| 6,855,914 B1 | 2/2005 | Kaufmann et al. | |
| 2004/0089645 A1 | 5/2004 | Saccon et al. | |
| 2004/0200819 A1 | 10/2004 | Kensrue | |
| 2004/0245230 A1 | 12/2004 | Huismann et al. | |
| 2005/0014410 A1 | 1/2005 | Justice | |

OTHER PUBLICATIONS

Suitcase X-treme 12VS, Miller Electric Manufacturing Co., Apr. 2005.
LN-5 Portable CV/CC Semiautomatic Wire Feeder, Feb. 1998, Lincoln Electric.

* cited by examiner

*Primary Examiner*—Jessica L. Ward
*Assistant Examiner*—Megha Mehta
(74) *Attorney, Agent, or Firm*—Louis F. Wagner; Hahn Loesser + Parks LLP

(57) ABSTRACT

Welding wire feeders are disclosed for providing welding wire and electrical power to a welding torch in a welding system, in which an input is provided including an input connector integrated into a switching device of the wire feeder or coupled thereto directly or through a short cable. The input connector includes a cavity to receive wire from a power source cable with a clamping device being provided for selectively clamping the cable wire to the connector or releasing the wire therefrom using only simple tools.

23 Claims, 8 Drawing Sheets

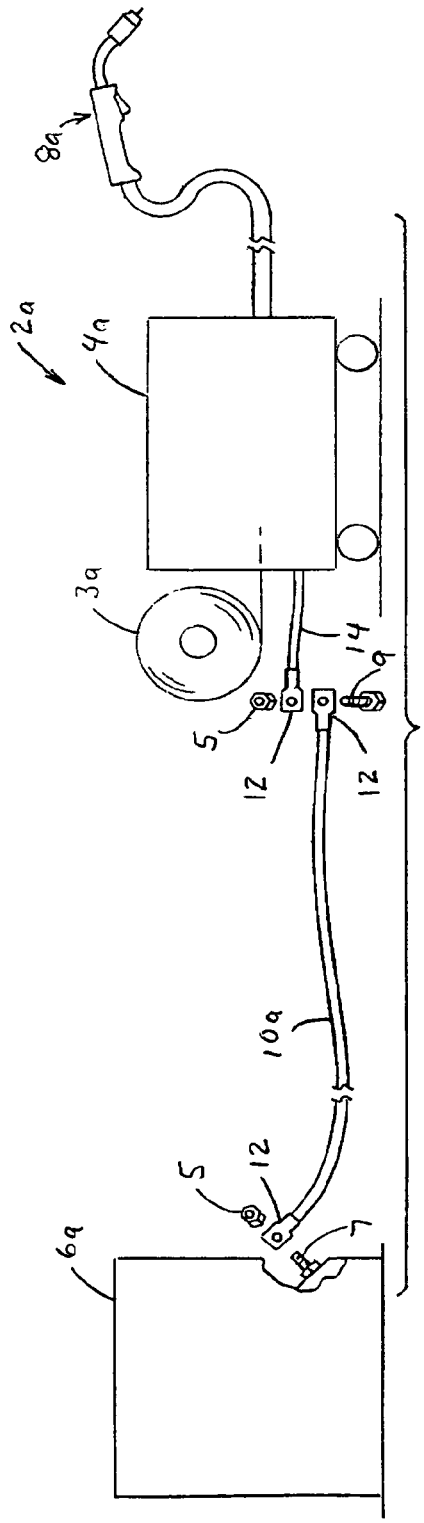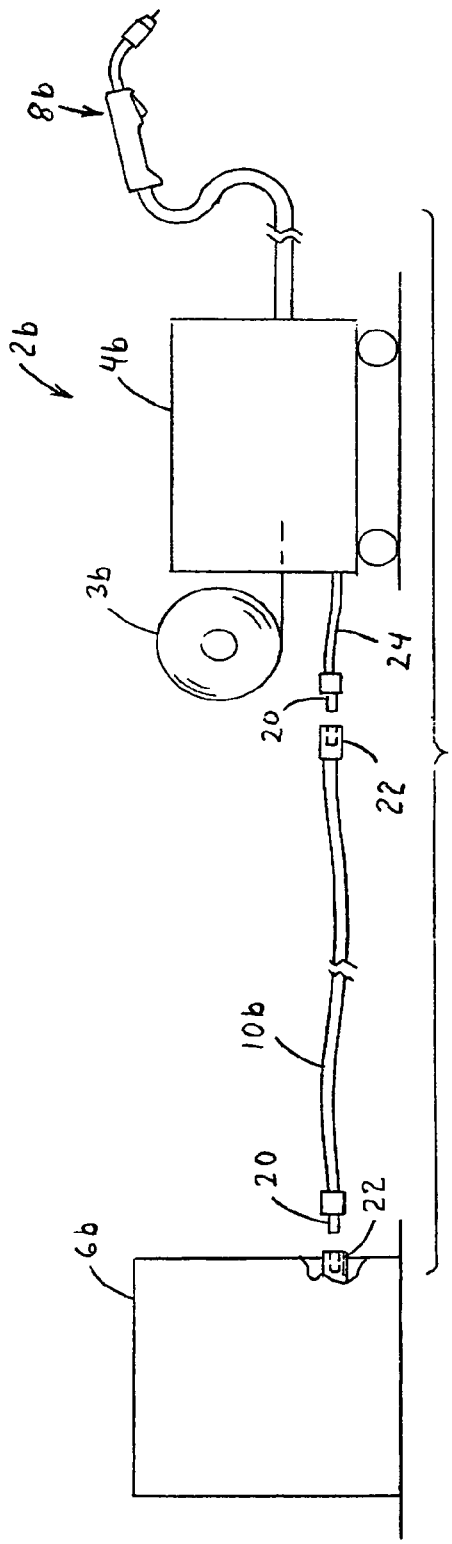

WELDING WIRE FEEDER AND CONNECTION APPARATUS

FIELD OF THE INVENTION

The present invention relates generally to arc welding technology, and more particularly to portable welding wire feeders and apparatus for connecting a welding power cable thereto.

INCORPORATION BY REFERENCE

Portable welding wire feeders and related technology is generally set forth in the following Unite State patents, the contents of which are hereby incorporated by reference as background information: Bellefleur U.S. Pat. No. 4,665,300; Kroll U.S. Pat. No. 4,508,954; Chandler U.S. Pat. No. 6,225,596; Miller U.S. Pat. No. 5,410,126; Grimm U.S. Pat. No. 5,836,539; and Matiash U.S. Pat. No. 6,707,004.

BACKGROUND OF THE INVENTION

Welding operations generally involve providing a welding arc between a welding electrode and a workpiece being welded, where the arc operates to melt the electrode material for deposition onto the workpiece to create a weld joint. Modem welding systems include a power source and a wire feeder, as well as a supply of welding electrode wire (typically on a spool) and may also include an optional supply of shielding gas. The electrode, sometimes referred to as a welding wire, is fed through a torch cable to a welding torch or gun, and electrical power is provided to the torch via electrical wiring in the torch cable. A conductive contact in the welding torch applies the welding power to the electrode for establishing an arc between the exposed portion of the electrode and the workpiece. If external shielding gas is used, for example, in gas metal arc welding (GMAW) processes, the torch cable also includes passageways for providing pressurized gas to shield the welding arc and weld metal from ambient conditions. The wire feeder includes one or more motorized rollers that direct the welding electrode from a supply reel through a tube in the torch cable, where the wire feeding apparatus may be included within the power source enclosure or may be separately housed.

Portable wire feeders are often used in shipyards and other situations where the location of the welding operation changes from time to time and is remote from the power source. This might include, for example, welding operations at job sites that change day-to-day or welding operations that cover a large area at a single job site. In these devices, a power source cable (sometimes referred to as an electrode cable) provides electrical power from the power source to the remote wire feeder. The portable wire feeder is connected to the welding torch by a torch cable having electrical wiring for providing power from the power source to the torch, as well as an internal tube for transporting the wire electrode, where the torch cable may have further optional provisions (e.g., passageways) for providing shielding gas to the torch and/or for circulating cooling fluid through the torch. In this manner, the remote wire feeder can be easily relocated to particular welding cites without moving the power source. In a typical arrangement, the portable wire feeder includes a housing or enclosure with an input cable for connecting to the power source cable to receive the welding power from the power source, as well as an output connected to a torch cable to which the welding power is provided together with the welding wire driven by a motorized wire feeding mechanism.

Matiash U.S. Pat. No. 6,707,004, incorporated herein by reference, describes a wire drive assembly having a cable securing built in to a wire drive casting for use in bench or stationary wire feeders where the electrode power is turned on and off directly at the power source. However, portable wire feeders typically have a means for switching the arc current, such as a contactor. In this regard, portable wire feeders are generally powered by the arc current, where power received from the power source cable at a wire feeder input is used to drive a wire feed control motor that rotates feed rolls for pulling wire from the spool or reel and forcing it through the gun or torch cable. A trigger on the torch closes a switch to initiate the welding operation (provision of electrical power to the welding electrode in the torch) as well as to start the drive motor for feeding wire. Examples of such remote or portable wire feeders include model numbers LN-25 and LN-15 sold by The Lincoln Electric Company of Cleveland, Ohio.

In operation, an electrical contactor is provided in the portable wire feeder housing and is controlled by the torch trigger to direct welding current to the torch contact surrounding the advancing wire electrode. Thus, whereas stationary wire feeders provide no internal power switching, portable wire feeders typically include on-board power switching apparatus. Furthermore, because the power source is often remote from the welding operation, operator controls and other user interface elements are sometimes provided on the portable wire feeder, for instance, allowing adjustment of welding current, wire feed speed, etc. Despite these differences, it is of course desirable for portable wire feeders to operate generally in the same manner as conventional stationary wire feeders with respect to controlling applied welding current and wire feed speed. However, such portable feeders are subjected to repeated movement and use in connection with a wide range of work environments, many of which can be severe, whereas stationary wire feeders typically enjoy controlled and unchanging environments, such as a work shop or factory floor. In addition to functioning like a stationary wire feeder, the portable wire feeder is preferably compact and lightweight enabling it to be more easily moved and used in confined work areas, as well as rugged and durable to withstand frequent transport and/or use in adverse conditions.

Referring to FIGS. 1A and 1B, because portable feeders are relocated frequently and are often used outdoors long distances away from the welding power source or maintenance offices, it is desirable to make the connection of the power source cable to the wire feeder input be simple, rugged and serviceable with a minimal number of tools. FIGS. 1A and 1B illustrate welding systems 2a and 2b with portable wire feeders 4a and 4b for providing power and welding wire from supply reels 3a and 3b to welding torches or guns 8a and 8b, respectively, showing different conventional methods of connecting power from a power source 6 to the remote wire feeder 4. FIG. 1A shows the system 2a including a welding power source 6a that provides electrical power to the wire feeder 4a by means of a power source cable 10a. In this approach, lugs 12 are attached to the ends of the cable 10a, and one end is connected to a lug bolt 7 at the output of the power source 6a using a threaded nut 5. The lugged cable 10a is then attached directly to a stud or bolt (not shown) inside the wire feeder 4a, or a short cable 14 is provided extending from the wire feeder 4a, which also includes a lug 12, as shown in FIG. 1A. In this case, the power source cable 10a and feeder cable 14 are bolted together at the lugs 12 using a bolt 9 and a nut 5, after which and the connection is insulated with insulating tape (not shown). A disadvantage to the lugged connection of FIG. 1A is that tools and tape are required for connecting the cable 10a to the wire feeder 4a. If one of the cables 10a, 14 breaks, moreover, it is necessary to put a new lug on the end of the cable, resulting in lost time while the parts and tools are found to make the repair.

FIG. 1B illustrates another conventional approach in the system 2b, where a cable 10b is provided for connecting power source 6b with the wire feeder 4b. The power source cable 10b in this case includes special "quick connects" 20 and 22 for attaching the cable 10 to the feeder 4b via a short feeder cable 24. The interconnection of the system 2b provides a specially machined female connector 22 attached to the feeder end of the cable 10b, and a mating male connector 20 attached to the wire feeder cable 24. Examples of these interconnections include connectors of model numbers K852-70 and K852-95 sold by The Lincoln Electric Company. These connectors 20 and 22 can be assembled and disassembled without tools or tape, thereby providing certain advantages over lugged connections of FIG. 1A, in that they are typically repairable without special lugging tools. However, the quick connects 20 and 22 are typically relatively large and prone to breaking. Furthermore, different types of quick connectors are providing by competing suppliers that are generally not interchangeable, wherein no single design has become an industry standard. Consequently, as the equipment is moved from job site to job site, the connectors need to be constantly changed. Thus, there is a need for improved portable wire feeders and connection apparatus therefor to facilitate connection of a power source to a remote portable welding wire feeder that is easily serviceable without specialized tooling.

SUMMARY OF INVENTION

A summary of one or more aspects of the invention is now presented in order to facilitate a basic understanding thereof, wherein this summary is not an extensive overview of the invention, and is intended neither to identify certain elements of the invention, nor to delineate the scope of the invention. Rather, the primary purpose of the summary is to present some concepts of the invention in a simplified form prior to the more detailed description that is presented hereinafter. The present invention relates to portable welding wire feeders that operate to provide welding electrode or wire to a welding torch as well as to selectively provide electrical power to the torch, where the provision of electrical power is selectively controlled by a switching device in the wire feeder. Easily serviceable apparatus is provided for connecting the electrode or power source cable to the portable wire feeder without requiring special tooling, while allowing universal connectivity of welding power source cables and wire feeders.

In accordance with one aspect of the invention, a portable wire feeder is provided, having an input for receiving power from a remote power source via a power source cable, as well as an output for selectively providing power and electrode wire to a welding torch through a torch cable. The input comprises a contactor, semiconductor type switch, or other suitable switching device, an input connector, and a clamping device, where the switching device includes a first electrical terminal or contact or for connection to a power source cable and a second electrical terminal coupled to the output. The switching device has two operating conditions for selectively controlling the provision of power to the welding torch, including a first condition in which the electrical terminals are electrically coupled and a second condition in which the electrical terminals are electrically isolated from one another.

The input connector is coupled to the first electrical terminal of the switching device to provide power to the electrical terminal from a coupled power source cable. In one implementation of the invention, the connector structure is coupled directly to the switching device, and may be integrated therein to reduce the number of parts and connections required for the welding current path, wherein the connector may be situated within the wire feeder housing or may wholly or partially extend outside the housing for ease of interconnection to the power source cable. In another possible embodiment, a short cable is provided to connect the connector to the switching device electrical terminal, with the connector being located outside said housing for ease of connection and servicing. The connector comprises a conductive structure coupled to the first switching device electrical terminal and a cavity to receive solid or stranded wire of a power source cable. In one implementation, the cable wire can be fitted with a ferrule with the cavity being further adapted to receive the ferrule to provide low impedance electrical connection of the cable wire to the switching device electrical terminal along with reliable mechanical attachment. The clamping or securing device mounts to the connector and is movable between a first position in which the cable wire/ferrule is clamped to the conductive structure and a second position where the cable wire is removable from the cavity. In one example, the input connector includes a threaded passageway extending laterally into the wire cavity, and a hex head or other type threaded screw is mounted therein for selectively clamping or releasing the wire/ferrule. In operation, power source cable may be first cut, and then a length of insulation is removed. The exposed wire may then be capped with a ferrule or may be directly inserted in the connector cavity, with the clamping device being repositioned to lock the cable in place. In this regard, various implementations of the invention allow connection of the power cable to the portable wire feeder using a common Allen wrench or screw driver.

In another aspect of the invention, the input may further include a thermal sensor such as a thermocouple, thermostat, RTD, etc., mounted on the input connector. A control circuit may also be provided, which is coupled to the thermal sensor, the switching device, and the output in the wire feeder, where the control circuit controls the operating condition of the switching device according to a temperature signal from the thermal sensor and according to a trigger signal from a torch connected to the output. In one example described below, the control circuit places the switching device in the first operating condition when the torch trigger is actuated by the operator and the temperature signal indicates that the connector is below a predetermined threshold temperature. However, when the connector temperature rises above the threshold temperature (or when the trigger is off), the control circuit puts the contactor in the second operating condition. In this manner, the thermal device signals the controller inside the wire feeder indicating the connector has exceeded a safe operating temperature, such as through loose or intermittent power connection causing increased impedance in the cable to switch contact connection. The controller can accordingly shut down the wire feeder, and may also alert the operator of the problem so it can be fixed before major damage occurs.

Another aspect of the invention provides a wire feeder comprising a wire feeding system for directing welding wire to a torch cable, an output for providing electrical power to the torch cable, a conductive member electrically coupled to the output, and an input for electrically connecting a power source cable to the conductive member. The input includes a connector coupled to the conductive member and spaced from the wire feeding system, as well as a clamping device mounted to the input connector for selectively clamping the power source cable wire to the input connector. In one implementation, the input connector includes a conductive structure with a cavity for receiving the power source cable wire, and the clamping device is mountable to the conductive structure and movable between a clamping position to clamp the wire to the conductive structure and a second position wherein the cable wire is removable from the cavity. The clamping device, moreover, may be manually operable to allow servicing without specialized tooling. In one example, the conductive structure of the input includes a threaded passageway extended into the cavity and the clamping device comprises a threaded structure rotatably mounted in the threaded passageway for movement between the clamping and releasing positions, and a tab is attached to the threaded structure to allow manual rotation of the threaded structure so that the cable connection can be serviced without tools.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages and novel features of the invention will become apparent from the following detailed description of the invention when considered in conjunction with the drawings, in which:

FIGS. 1A and 1B are simplified side elevation views illustrating welding systems with conventional lug-type and cable plug connections, respectively, between a welding power source and an external portable wire feeder;

DETAILED DESCRIPTION OF THE INVENTION

Figure 2:
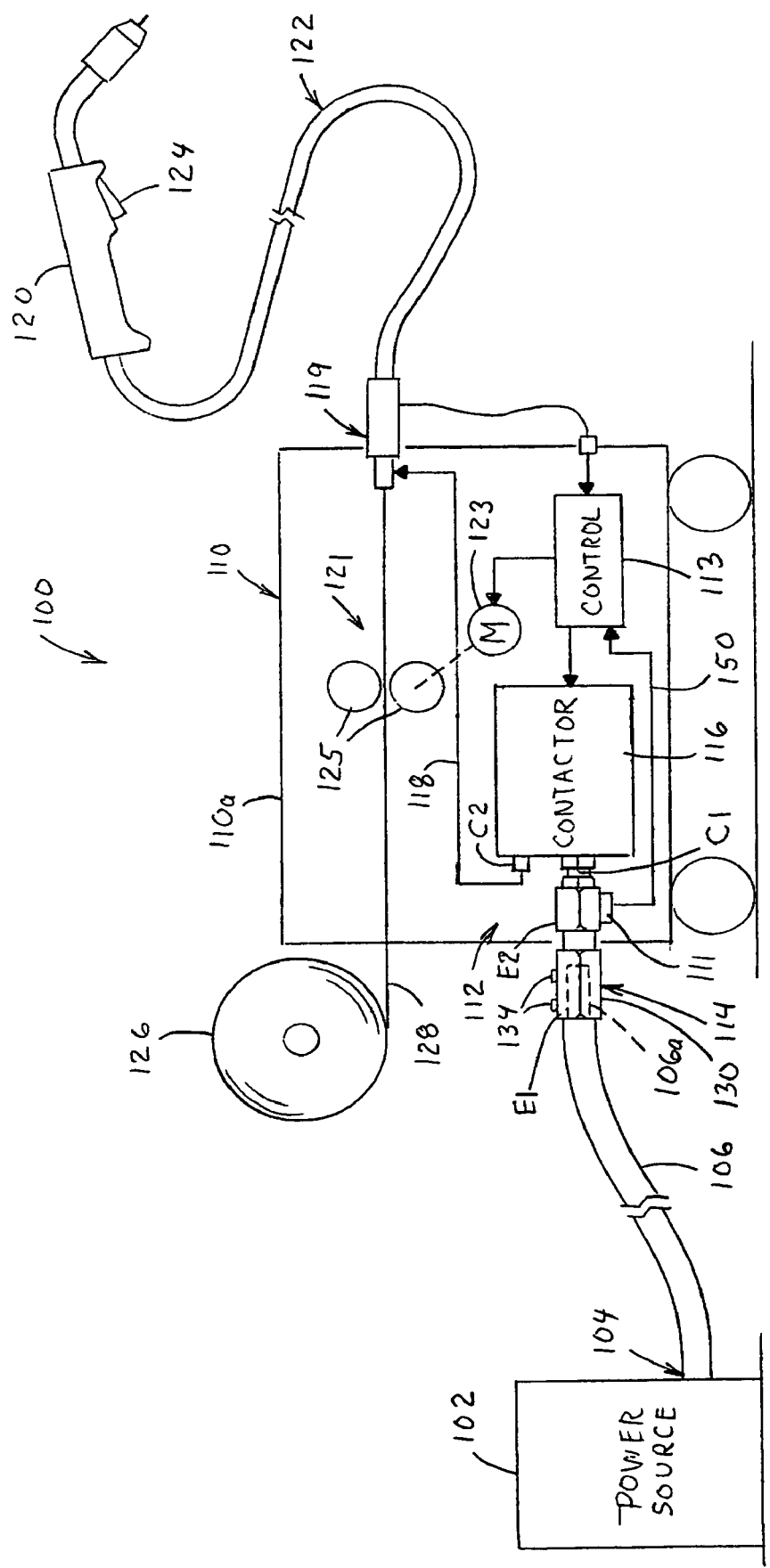
FIG. 2 is a side elevation view illustrating a welding system having an exemplary portable wire feeder with improved power source cable connection apparatus including a temperature sensor according to various aspects of the present invention.

The invention relates to portable welding wire feeders with reliable and easily serviceable input connections for power source cables. One or more exemplary implementations of the present invention are hereinafter illustrated and described, wherein like reference numerals are used to refer to like elements throughout and wherein the illustrated structures are not necessarily drawn to scale.

Figure 3:
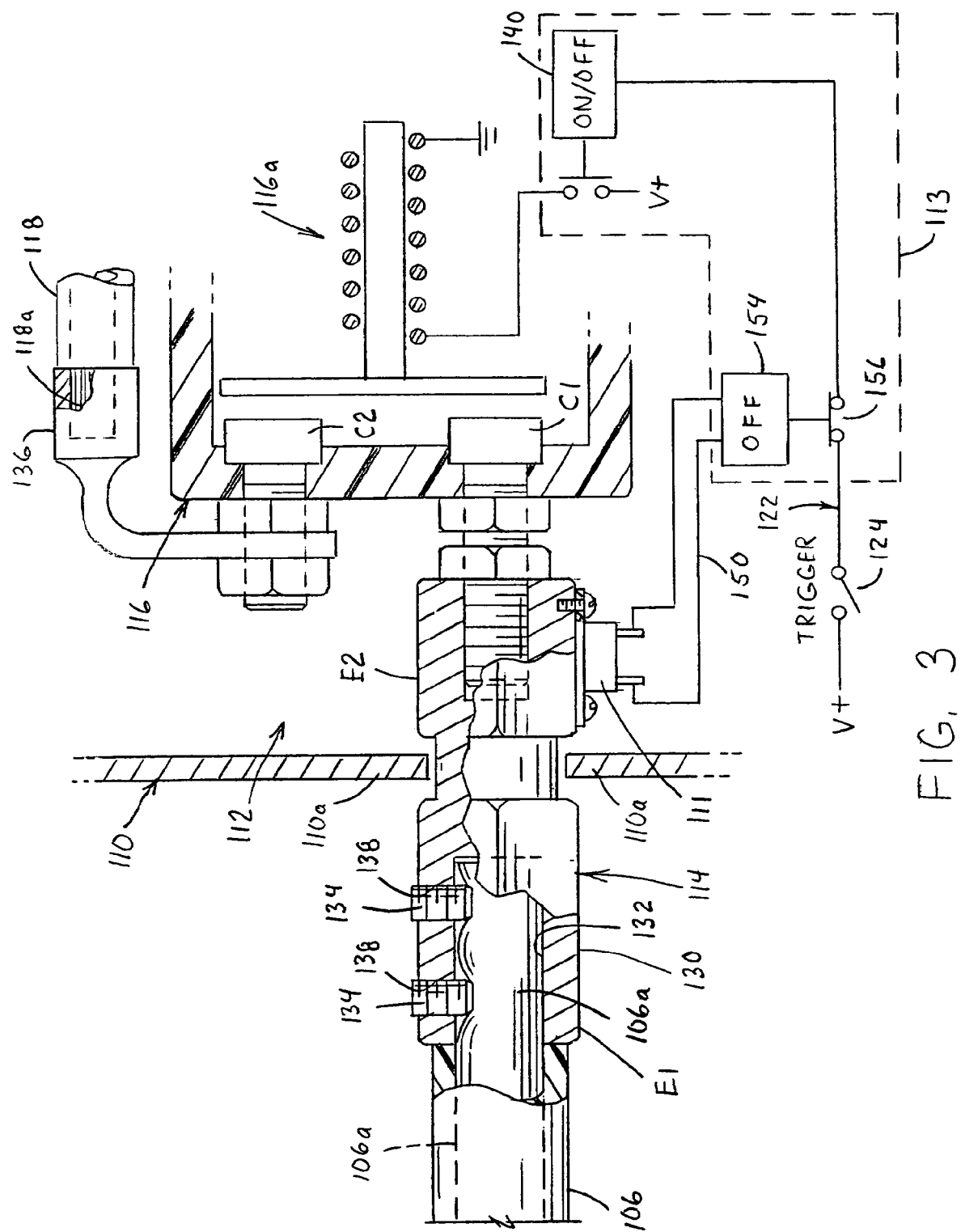
FIG. 3 is a partial side elevation view in section illustrating a first embodiment of a portable wire feeder input connector for receiving electrical power from a welding power source via a power source cable, in which the input connector is directly coupled to a switching device contact or electrical terminal and a series control circuit controls operation of the switching device in accordance with the invention.
Figure 7:
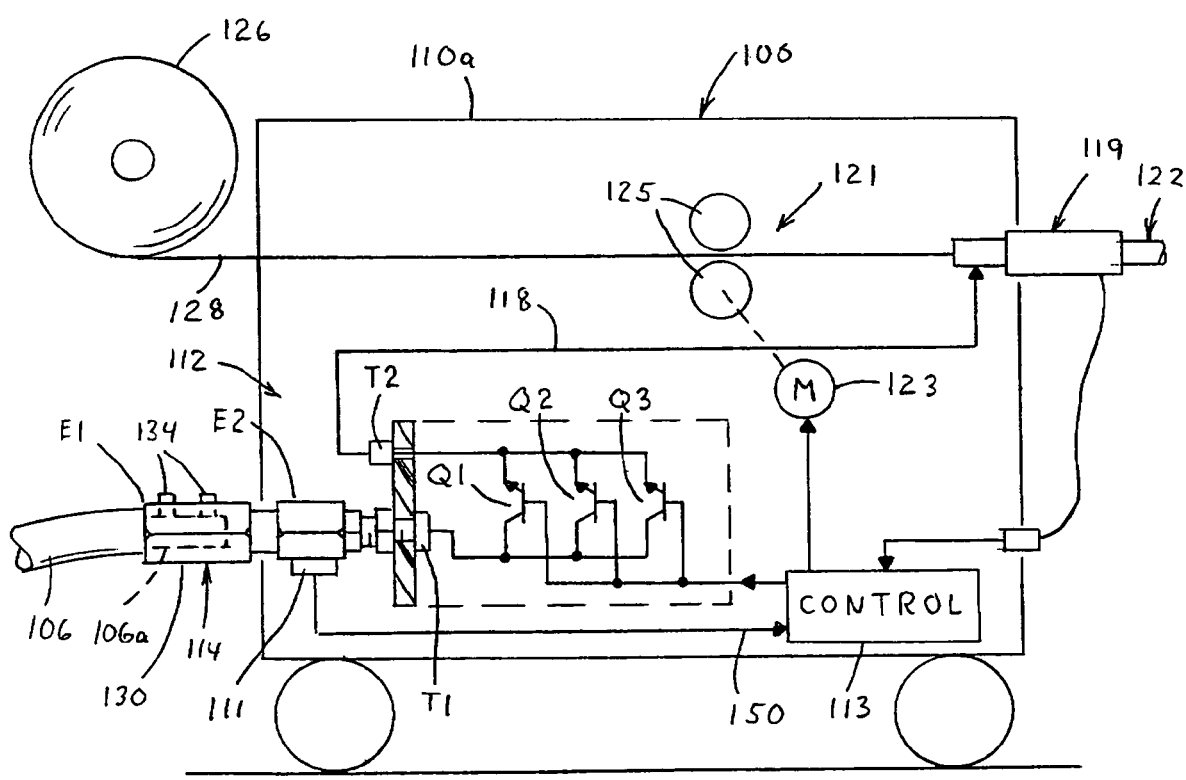
FIG. 7 is a side elevation view illustrating the welding system having a semiconductor type switching device with a first electrical terminal coupled to the power source cable connection apparatus including a temperature sensor according to the invention.

Referring initially to FIGS. 2 and 3, various aspects of the invention are illustrated in conjunction with a welder or welding system 100 including a power source 102, a portable wire feeder 110 and a welding torch 120 coupled to the wire feeder 110 by a torch cable 122. The power source 102 converts input power to provide welding current and voltage waveforms (e.g., a welding signal) at an electrical output 104 thereof for selective application of the welding signal to a welding process (not shown) via a circuit formed by a power source cable 106, a wire feeder input 112 with an input connector 114 and a contactor type switching device 116, an output cable 118 providing connection from the contactor 116 to torch cable 122 at a wire feeder output 119, and the torch 120. Contactor switching device 116 includes first and second electrical terminals or contacts C1 and C2, respectively, and is operable to selectively provide electrical connection therebetween in a first operating condition or mode and to electrically separate or isolate electrical terminals C1 and C2 from one another in a second operating condition. Any suitable input switching device may be employed in the present invention, wherein FIG. 3 illustrates the exemplary contactor 116 having a solenoid 116a to selectively connect or isolate electrical terminals C1 and C2 according to an on/off control signal 140 to selectively energize or de-energize a coil of contactor solenoid 116a. FIG. 7 illustrates another possible switching device having semiconductor type switches in accordance with another aspect of the invention.

As seen in FIG. 2, output 119 also provides welding electrode wire 128 to torch cable 122 from a reel or other wire supply 126, where reel may be internal to or outside of a wire feeder housing or enclosure 110a. Wire 128 is drawn or paid out from supply reel 126 via a motorized wire feeding system 121 including a motor 123 driving one or more feed rolls 125 so as to direct wire 128 from reel 126 to output 119 for provision of wire 128 to a welding operation through torch cable 122, wherein motor 123 may be separately supplied or may be powered by power from power source cable 106. Wire feeder may optionally include apparatus (not shown) for directing shielding gas to a welding operation via torch cable 122. In operation during a welding operation, an operator actuates trigger 124 on torch 120, causing activation of on/off signal 140, by which solenoid 116a of contactor 116 electrically connects electrical terminals C1 and C2 to one another. Connection of electrical terminals C1 and C2 initiates provision of the welding signal from power source 102 through contactor 116 at input 112 of wire feeder 110, where the trigger actuation also controls operation of the motorized feeding system 121 (FIG. 2).

Figure 5:
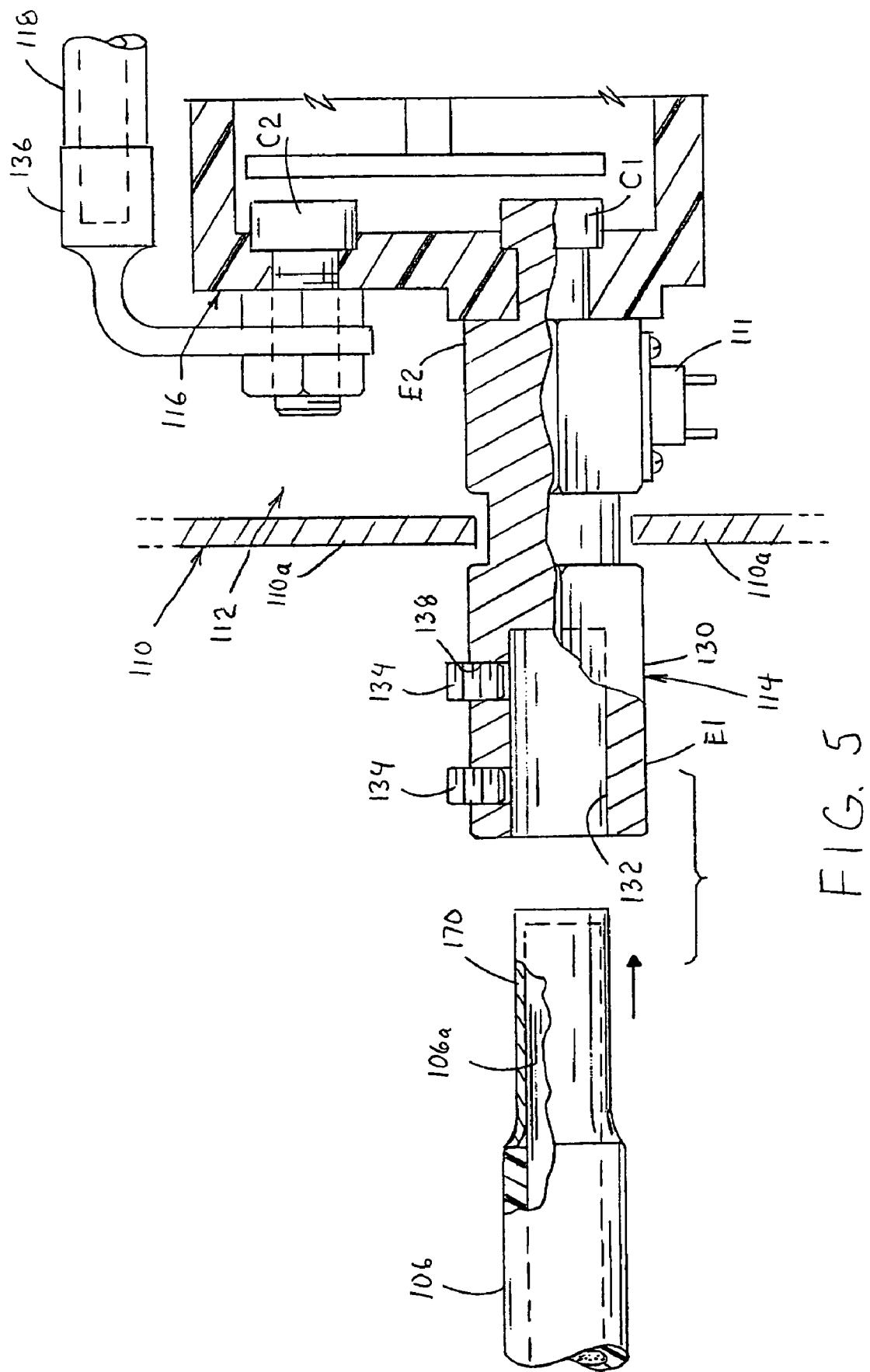
FIG. 5 is a partial side elevation view in section illustrating another embodiment of a portable wire feeder according to an aspect of the invention, in which an input connector is integral with the contactor switching device.
Figure 6:
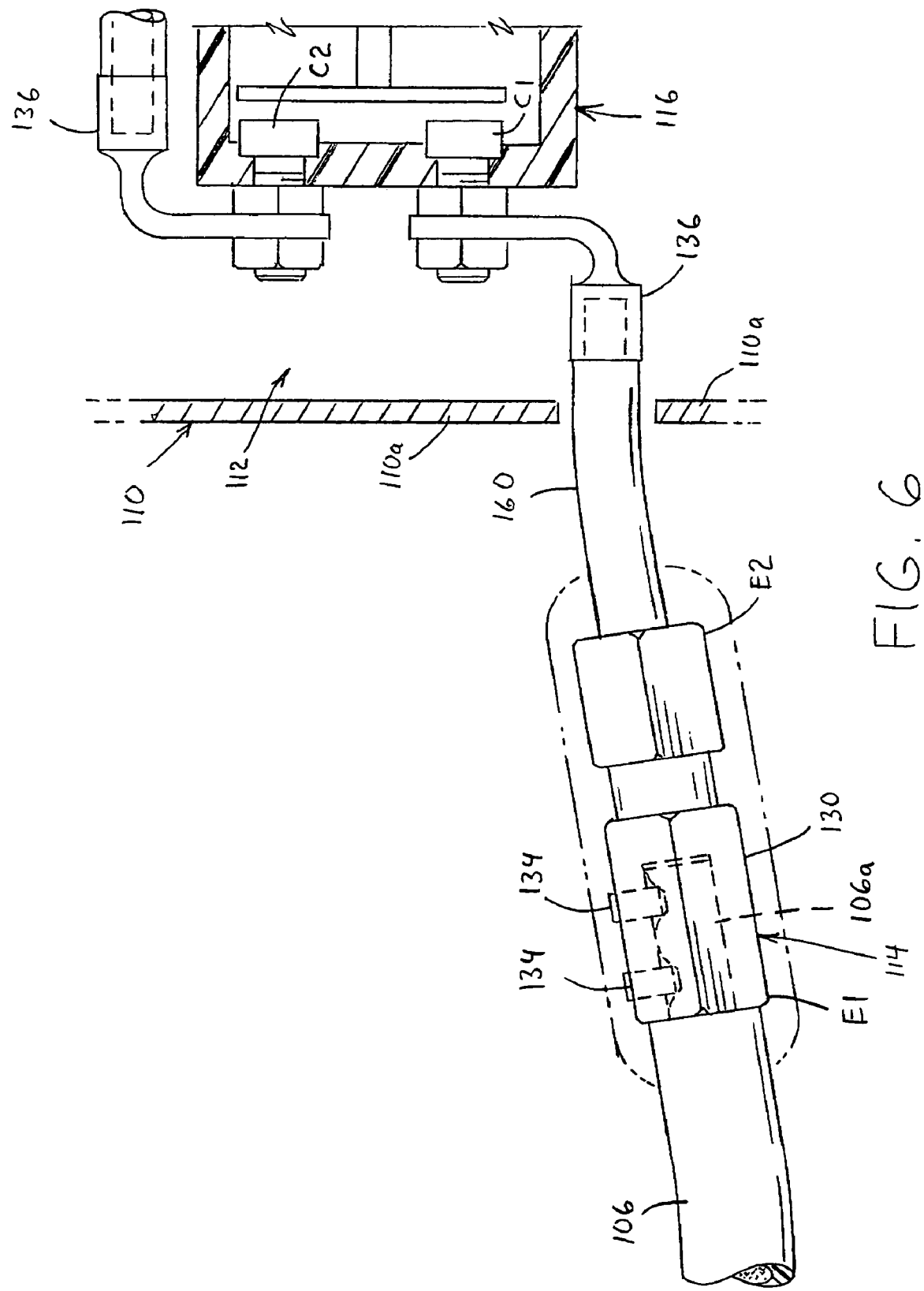
FIG. 6 is a partial side elevation view in section illustrating yet another example of a portable wire feeder according to the invention, wherein an input connector is located outside the wire feeder housing and is connected to the switching device electrical terminal by a short cable.

As best shown in FIG. 3, input connector 114 includes a conductive structure 130, which can be of any suitable shape and dimensions and which can be constructed of any suitable conductive material, including but not limited to brass, copper, aluminum, etc. Conductive connector structure 130 comprises first and second ends E1 and E2, respectively, with second end E2 being coupled directly to switching device electrical terminal C1. FIGS. 2 and 3 illustrate one exemplary direct coupling or connection of conductive structure 130 to electrical terminal C1, in which electrical terminal C1 includes an outwardly extending threaded stud and second end E2 includes a corresponding threaded cavity (not shown) with structure 130 being threaded onto the stud to provide electrical connection of conductive connector structure 130 to electrical terminal C1. Other suitable direct coupling techniques may be used within the scope of the invention, such as shown below in FIG. 5, wherein conductive connector structure 130 is integrated into or integral with contactor 116 so as to reduce the number of components and electrical interconnections in the welding current path. As shown in FIG. 2, moreover, first end E1 of connector 116 may extend at least partially outside the housing for ease of interconnection to power source cable 106, or may alternatively be located entirely within wire feeder housing 110a. Another possible configuration is illustrated in FIG. 6 in which a short cable 160 is provided to couple connector 114 to electrical terminal C1, with connector structure 130 being outside housing 110a for ease of connection and servicing. As shown in FIG. 3, connector structure 130 also comprises a cavity 132 extending into first end E1, where cavity 132 is sized and otherwise adapted to receive solid or stranded wire 106a of power source cable 106. As shown in FIGS. 2 and 3, second switching device electrical terminal C2 includes an angled lug type connection 136 crimped onto wire 118a of output cable 118, where cable 118 runs from contactor 116 to output 119 and through torch cable 122 to provide the welding signal to torch 120 when contactor 116 is in the first operating condition.

The input 112 further includes one or more clamping devices 134 mountable to conductive structure 130 for locking of claming wire 106a to structure 130 thereby providing a low impedance electrical connection therebetween. Any suitable clamping device may be employed within the scope of the invention, which is movable between a first position in which cable wire 106a is clamped in contact with conductive structure 130 and a second position in which cable wire 106a is removable from cavity 132. In the illustrated implementation, first end E1 of conductive connector structure 130 includes two threaded passageways 138 extending between an outer surface of structure 130 and cavity 132. The exemplary clamping devices 134 in this example are threaded screws mountable in passageways 138 and rotatably translatable between a first position in which screws 134 clamp wire 106a to structure 130 and a second position in which wire 106a is removable from cavity 132. As shown in FIG. 5, moreover, cavity 132 may be adapted to receive a ferrule 170 crimped around an end of power source cable 106 (e.g., around wire 106a thereof), wherein clamping screws 134 operate to selectively engage ferrule 170 for clamping thereof to conductive structure 130 in cavity 132. In this regard, the use of such a ferrule may help to contain the individual strands of wire 106a in power source cable 106 for improved mechanical and/or electrical connection.

Figure 4:
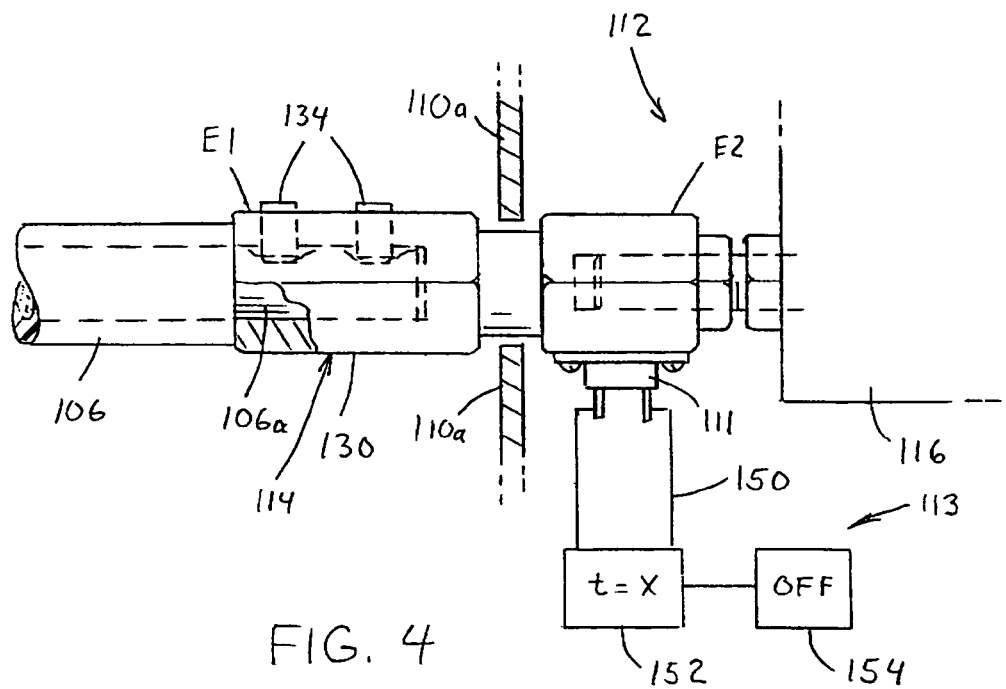
FIG. 4 is a simplified schematic diagram illustrating an exemplary control circuit for selectively discontinuing welding power according to connector temperature.

Referring now to FIGS. 2-4, in accordance with a further aspect of the invention, the exemplary wire feeder input 112 further includes a thermal sensor 111 mounted on input connector 114, as well as a control circuit 113 coupled to sensor 111, contactor 116, and to at least one electrical signal wire of torch cable 122 at output 119. Any thermal sensor device or system 111 can be employed in accordance with the present invention, which senses a temperature associated with input connector 114 and provides a temperature signal 150 indicative of whether the input connector temperature is above or below a predetermined threshold temperature value. In one example, sensor 111 is a thermocouple, resistive temperature device (RTD), thermistor, etc. which can be self-energized (e.g., thermocouple made of dissimilar metals by which a voltage signal 150 is generated indicating sensor temperature) or externally energized to provide such a temperature signal 150, along with circuitry or other components 152 to compare the temperature signal 150 to a threshold value X, whereby a control signal 154 can be generated to control switching state of the switching device 116. A single thermostat type device may alternatively be used, which directly generates a binary on/off signal 154 which can be used by the control circuit 113 to control operation of contactor 116. In the example of FIG. 3, control circuit can be a simple series connection of trigger switch 124 with a contact 156 controlled by temperature signal 154 for selectively activating solenoid 116a of contactor 116 according to an on/off signal 140. In this configuration, control circuit 113 controls the operating condition of contactor 116 by placing switching device 116 in the first operating condition (electrical terminals C1 and C2 coupled) when trigger 124 is actuated and when the temperature signal 150 indicates that connector 114 is below the temperature threshold, and alternatively control circuit 113 places contactor 116 in the second operating condition (electrical terminals C1 and C2 isolated) when trigger 124 is not actuated or connector 114 is above the threshold. In this manner, the thermal sensor 111 and the control circuit 113 can selectively inhibit the provision of welding current to torch cable 122 if the input connection becomes overheated. In this regard, the threshold can be selected so as to correspond to high impedance status of the input connection, and the temperature signal 150 or 154 can optionally be used by control circuit 113 to alter an operator to the high temperature condition.

This invention thus provides improvements over existing portable wire feeder input connector designs by providing cable securing apparatus 114, 134 at the wire feeder input 112 that requires minimal tools and is easily serviceable. To attach power source cable 106, the end thereof is cut or trimmed to make a clean end, and a portion of the cable insulation is stripped or otherwise removed. The bare cable wire 106a is then inserted into the connector cavity 132, and a thumb screw or other clamping device 134 is moved into the closed position to lock the cable 106 in place. The inclusion of the thermal sensor 111 provides an interlocking signal 150, 154 to the control circuitry 113 of wire feeder 110 indicating the connector 114 has exceeded a safe operating temperature. The wire feeder control circuit 113 may then shut down feeder 110 and alert the operator of the problem, thereby allowing correction or repair prior to system damage. As discussed above, moreover, the direct connection of input connector 114 to switching device 116 inside wire feeder 110 facilitates reduction in the number of components and electrical connection operations in constructing the wire feeder 110 and minimizes impedance of the welding current path.

Referring now to FIG. 5, another aspect of the invention provides for integrating an input connector 114 with contactor 116 inside wire feeder 110, for further reduction in parts and connections. In this implementation, all or a portion of input connector 114 and the conductive structure 130 thereof can be situated within the wire feeder enclosure 110a. In another possible implementation, conductive inserts or ferrules can be provided with different inner shapes or profiles to accommodate a variety of common quick connectors, so as to facilitate connection of preexisting power source cables inside cavity 132 of connector 114. As shown in FIG. 6, moreover, still other embodiments are possible in which a short cable 160 connects second end E2 of conductive structure 130 to first switching device electrical terminal C1, wherein conductive structure 130 may be located entirely outside wire feeder housing 110a.

FIG. 7 illustrates another possible switching device 116a having semiconductor type switches Q1, Q2, and Q3 (e.g., IGBTs, power MOSFET transistors, etc.) configured in parallel for selectively coupling first and second terminals or contacts T1 and T2 to one another according to a control signal from controller 113, with the conductive structure 130 directly connected to the first switching device terminal T1 in accordance with the invention. The first terminal T1 may include an outwardly extending threaded stud for connection to second end E2 of structure 130 via a threaded cavity thereof to electrically connect structure 130 to contact terminal T1. As with the above example having a contactor type switching device 116, other suitable direct coupling techniques may be used in conjunction with semiconductor type switching device 116a, such as integration of conductive structure 130 with a circuit board or other structure 116a (e.g., similar to FIG. 5 above) that includes one or more semiconductor switches Q1, Q2, Q3, or configurations like that in FIG. 6 in which a short cable is provided to couple connector 114 to contact terminal T1, with connector structure 130 being outside housing 110a. Furthermore, a temperature sensor 111 may be provided proximate connector 114 as discussed above and as shown in the example of FIG. 7. Alternatively, such a thermal sensor 111 could instead be mounted on switching device structure 116a, such as directly on a printed circuit board (PCB) to which transistor switches Q1-Q3 are mounted, with the associated thermal control signal 150 being provided to control circuit 113 from PCB 116a. It is further noted that although illustrated as having a plurality of semiconductor type switches Q1-Q3, other implementations are possible using a single semiconductor type switch for selective connection of terminals T1 and T2 according to a control signal, or where any number of two or more such devices are coupled between terminals T1 and T2 to provide such selective switching functionality.

Figure 8:
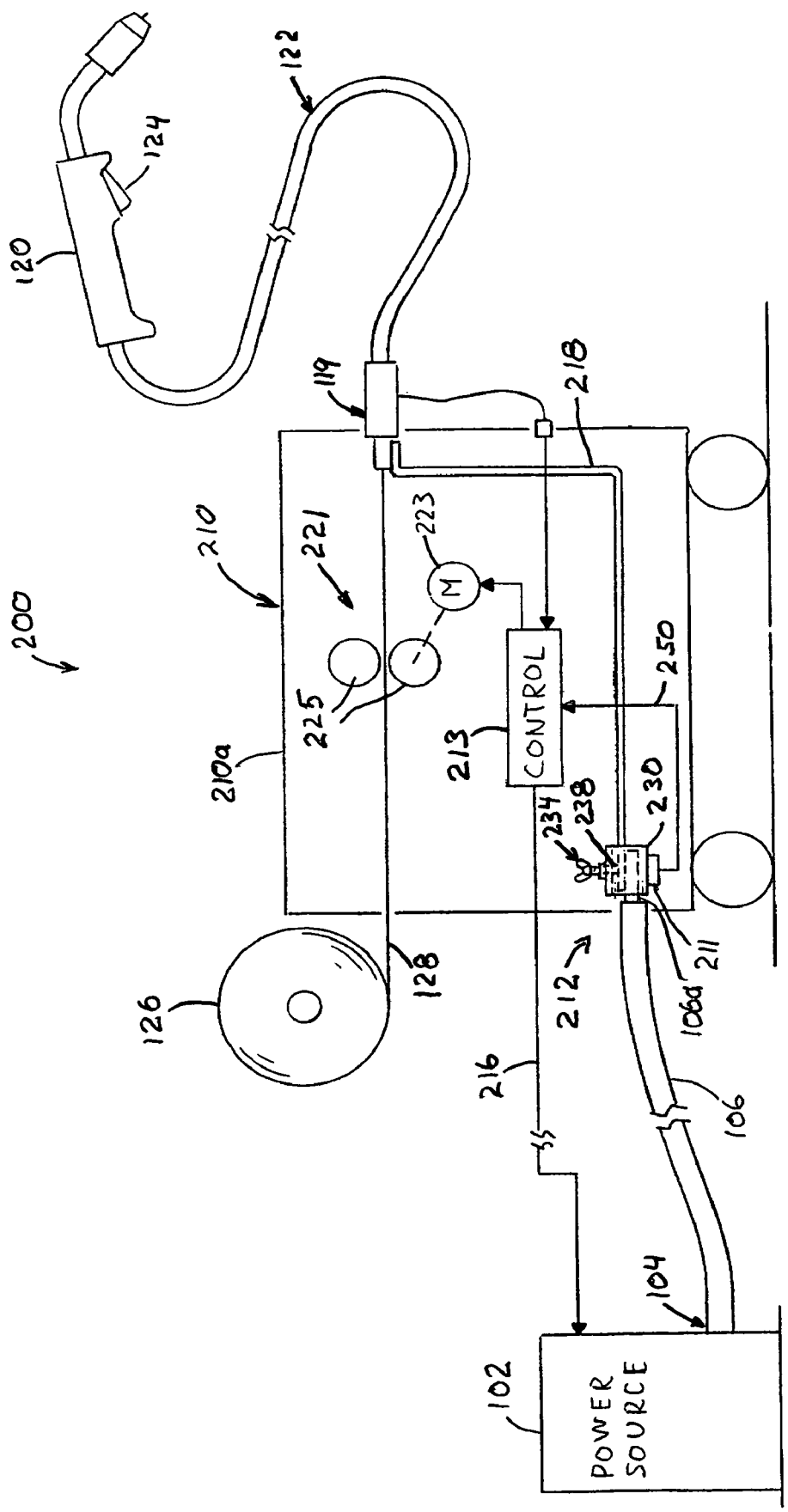
FIG. 8 is a side elevation view illustrating another exemplary welding wire feeder with an input connector for coupling a power source cable to a busbar in electrical communication with a welding torch cable, where the input connector requires no tools for power source cable replacement according to further aspects of the invention.
Figure 9:
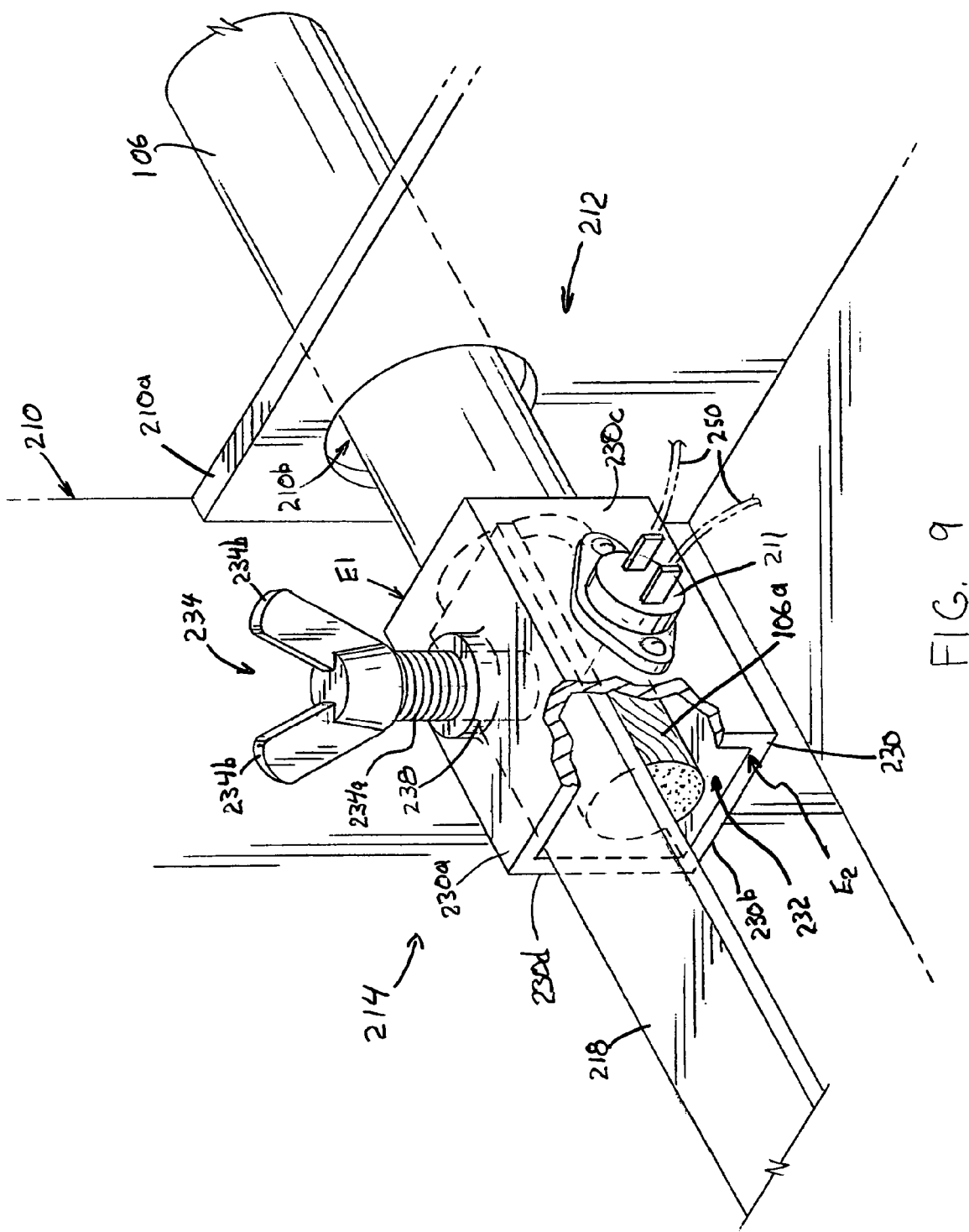
FIG. 9 is a partial perspective view showing further details of the input connector in the wire feeder of FIG. 8.

Referring now to FIGS. 8 and 9, another exemplary welding system 200 is illustrated in FIG. 8, including a wire feeder 210 operable to provide welding wire 128 and electrical power to a welding torch cable 122 for provision to a welding operation. The system 200 includes a power source 102 coupled to provide welding power to the feeder 210 by a cable 106, and a welding torch 120 coupled to the feeder 210 by a torch cable 122. The power source cable 106 is coupled to feeder 210 at a wire feeder input 212 with an input connector 214, wherein power from input 212 is coupled to the output 119 of the feeder 210 via a conductive structure 218, in this case, a conductive copper busbar structure. The output 119 also provides welding electrode wire 128 to torch cable 122 from a wire supply 126 via a wire feeding system 221 with a motor 223 driving one or more feed rolls 225. Unlike the feeder 110 described above, the wire feeder 210 in FIGS. 8 and 9 provides direct power connection to the output 119 with no intervening switching device, wherein input connector 214 is electrically coupled to a conductive copper busbar member 218 and is spaced from the wire feeding system 221. Power source 102 is operable to selectively provide or discontinue current supply to the cable 106 during welding, obviating the need for a separate switching device in wire feeder 210. A control circuit or system 213 is provided in the exemplary wire feeder 210 to operate the motorized feeding system 221, which receives operator control signals from the torch trigger 124 and exchanges signals with the power source 102 via a control cable 216, wherein power source 102 may be operable to selectively provide welding power to cable 106 according to the position of the torch trigger 120 based on signals from control circuit 213. Alternatively, the control signal from torch trigger 124 may be provided directly to power source 102 through other cabling (not shown), with control cable 216 providing one or more control signals to the wire feeder 210 for controlling the provision of welding wire 128 to the torch cable 122, for displaying diagnostic or other information on a user display of the wire feeder 210 (not shown), or for other control functions in the welding system 200.

As best shown in FIG. 9, input connector 214 includes a conductive structure 230, which can be of any suitable shape and dimensions and which can be constructed of any suitable conductive material, including but not limited to brass, copper, aluminum, etc. Conductive connector structure 230 comprises first and second ends E1 and E2, respectively, and a cavity 232 extending between ends E1 and E2. In the illustrated example, the conductive structure 230 is a rectangular brass structure having top, bottom, and side walls 230a-230d extending between the ends E1 and E2 and defining the cavity 232, wherein wire 106a of power source cable 106 enters connector 214 at the first end E1 and the conductive copper busbar member 218 enters connector cavity 232 at second end E2. A wing screw clamping device 234 is mounted in a threaded passageway 238 that extends through top wall 230a and into cavity 232, where the device 234 includes a threaded structure 234a rotatably mounted in passageway 238 and tabs 234b extending outwardly from the threaded structure 234a allowing manual rotation of the structure 234a. Cable wire 106a enters a lower portion of cavity 232 and busbar member 218 is positioned above wire 106a between wire 106a and top wall 230a, wherein rotating clamping device 234 in a first direction moves device 234 to a first position causing wire 106a to be fixedly clamped to input connector 214, and retracting device 234 to a second position allows wire 106a to be removable from cavity 232. In this manner, power source cable connection or servicing at input 212 can be accomplished manually without tools. In the illustrated example of FIGS. 8 and 9, the connector 214 is situated within the wire feeder housing or enclosure 210a, although other embodiments are possible in which 214 is wholly or partially located outside housing 210a, for example, wherein first end E1 is easily externally accessible for cable connection. As shown in FIG. 9, the illustrated embodiment provides an access hole or aperture 210b through a back wall of the wire feeder enclosure 210a for passage of cable 106 therethrough, along with an opening allowing manual rotation of the clamping screw 234 from outside the enclosure 210a. In another possible implementation of the invention, a manually operable connector 214 may be provided in a wire feeder having an internal switching device (e.g., wire feeder 110 described above), wherein the connector 214 or equivalent devices may be integrated into or otherwise directly connected to such switching device (e.g., to a contact or terminal thereof), for instance, using a short cable or other direct connection means. As shown in FIGS. 8 and 9, moreover, the input 212 further includes a thermal sensor 211 mounted on input connector 214 and connected with the control circuit 213, wherein any thermal sensor device or system 211 can be used (e.g., thermocouple, RTD, thermistor, etc.) which senses a temperature associated with input connector 214 and provides a temperature signal 250 that can be used to ascertain whether connector 214 is above or below a predetermined threshold temperature value. As described above, moreover, the temperature indication 250 may be employed by the control circuit 213 and/or by the power source 102 to selectively discontinue provision of current to power source cable 106 when the input temperature exceeds the threshold.

The invention has been illustrated and described with respect to one or more exemplary implementations or embodiments, although equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

Having thus described the invention, the following is claimed:

1. A portable wire feeder for providing welding wire and electrical power to a welding torch, said wire feeder comprising:
    an output adapted to provide electrical power and welding wire to a torch cable; and
    an input comprising:
        a switching device with first and second electrical terminals, said second electrical terminal being electrically coupled to said output, said switching device having a first operating condition in which said first and second electrical terminals are electrically coupled to one another and a second operating condition in which said first and second electrical terminals are electrically isolated from one another, and
        an input connector coupled directly to said switching device, said input connector comprising: a conductive structure having a first end, a second end coupled to said first electrical terminal of said switching device, and a cavity extending into said first end to receive solid or stranded wire of a power source cable, and
        a clamping device mountable to said conductive structure, said clamping device being movable between a first position in which said wire of said power source cable is clamped to said conductive structure and a second position in which said wire of said power source cable is removable from said cavity.

2. A portable wire feeder as defined in claim 1, wherein said input further comprises a thermal sensor mounted on said input connector.

3. A portable wire feeder as defined in claim 2, wherein said input further comprises a control circuit coupled to said thermal sensor, said switching device, and said output, said control circuit being operable to control the operating condition of said switching device according to a temperature signal from said thermal sensor and according to a trigger signal from a torch connected to said output.

4. A portable wire feeder as defined in claim 3, wherein said control circuit places said switching device in said first operating condition when a trigger of the torch is actuated and said temperature signal indicates said input connector is below a predetermined threshold temperature, and wherein said control circuit places said switching device in said second operating condition when said trigger is not actuated or when said input connector is above said threshold temperature.

5. A portable wire feeder as defined in claim 2, further comprising a housing enclosing said switching device, wherein said first end of said conductive structure is at least partially outside said housing.

6. A portable wire feeder as defined in claim 1, further comprising a housing enclosing said switching device, wherein said first end of said conductive structure is at least partially outside said housing.

7. A portable wire feeder as defined in claim 6, wherein said input connector is integral with said switching device.

8. A portable wire feeder as defined in claim 5, wherein said input connector is integral with said switching device.

9. A portable wire feeder as defined in claim 2, wherein said input connector is integral with said switching device.

10. A portable wire feeder as defined in claim 1, wherein said input connector is integral with said switching device.

11. A portable wire feeder as defined in claim 1, wherein said cavity is adapted to receive a ferrule located around an end of the power source cable, and wherein said clamping device clamps said ferrule to said conductive structure in said first position.

12. A portable wire feeder as defined in claim 1, further comprising a motorized wire feeding system including a motor and a feed roll driven by said motor to direct a welding wire from a wire supply to said output for provision of said welding wire to a welding operation through the torch cable.

13. A portable wire feeder as defined in claim 1, wherein said input connector includes a threaded passageway extending between an outer surface of said conductive structure and said cavity and said clamping device is a threaded screw mountable in said threaded passageway and movable between said first position in which said screw clamps said wire to said conductive structure and said second position in which said wire is removable from said cavity.

14. A portable wire feeder as defined in claim 1, wherein said switching device is a contactor.

15. A portable wire feeder as defined in claim 1, wherein said switching device comprises a semiconductor type switching device.

16. A portable wire feeder for providing welding wire and electrical power to a welding torch, said wire feeder comprising: a wire feeding system adapted to direct welding wire from a wire supply to a torch cable; an output adapted to provide electrical power to the torch cable; and an input comprising a switching device, an input connector, and a clamping device, said switching device having first and second electrical terminals, said second electrical terminal being electrically coupled to said output, said switching device having a first operating condition in which said first and second electrical terminals are electrically coupled to one another and a second operating condition in which said first and second electrical terminals are electrically isolated from one another, said input connector comprising a conductive structure having a first end, a second end coupled to said first electrical terminal of said switching device, and a cavity extending into said first end to receive a power source cable wire, and said clamping device being mountable to said conductive structure and movable between a first position in which said wire of said power source cable is clamped to said conductive structure and a second position in which said wire of said power source cable is removable from said cavity.

17. A portable wire feeder as defined in claim 16, wherein said input further comprises a thermal sensor mounted on said input connector.

18. A portable wire feeder as defined in claim 16, further comprising a housing enclosing said switching device, and a short cable connecting said second end of said conductive structure to said first electrical terminal of said switching device, wherein said conductive structure is outside said housing.

19. A portable wire feeder as defined in claim 17, wherein said input further comprises a control circuit coupled to said thermal sensor, said switching device, and said output, said control circuit being operable to control the operating condition of said switching device according to a temperature signal from said thermal sensor and according to a trigger signal from a torch connected to said output.

20. A portable wire feeder as defined in claim 19, wherein said control circuit places said switching device in said first operating condition when a trigger of the torch is actuated and said temperature signal indicates said input connector is below a predetermined threshold temperature, and wherein said control circuit places said switching device in said second operating condition when said trigger is not actuated or when said input connector is above said threshold temperature.

21. A portable wire feeder as defined in claim 16, wherein said switching device comprises a semiconductor type switching device.

22. A portable wire feeder for providing welding wire and electrical power to a welding torch, said wire feeder comprising: an output adapted to provide electrical power and welding wire to a torch cable; a switching device with first and second electrical terminals, said second electrical terminal being electrically coupled to said output, said switching device having a first operating condition in which said first and second electrical terminals are electrically coupled to one another and a second operating condition in which said first and second electrical terminals are electrically isolated from one another, wherein said first electrical terminal comprising a conductive structure having a cavity extending therein to receive wire of a power source cable; and a clamping device mountable to said conductive structure and movable between a first position in which said wire of said power source cable is clamped to said conductive structure and a second position in which said wire of said power source cable is removable from said cavity.

23. The wire feeder of claim 22, wherein said conductive structure includes a threaded passageway extended between an outer surface of said conductive structure and said cavity and wherein said clamping device comprises a threaded structure rotatably mounted in said threaded passageway and movable between said first position in which said clamping device clamps said wire to said conductive structure and said second position in which said wire is removable from said cavity, said clamping device further comprising at least one tab attached to said threaded structure and extending outwardly therefrom to allow manual rotation of said threaded structure.

\* \* \* \* \*

UNITED STATES PATENT AND TRADEMARK OFFICE
CERTIFICATE OF CORRECTION

PATENT NO. : 7,624,908 B2  Page 1 of 1
APPLICATION NO. : 11/205864
DATED : December 1, 2009
INVENTOR(S) : Enyedy et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 650 days Delete the phrase "by 650 days" and insert -- by 771 days --

Signed and Sealed this

Seventeenth Day of August, 2010

David J. Kappos
*Director of the United States Patent and Trademark Office*